United States Patent
Sung (12)

(10) Patent No.: US 6,260,506 B1
(45) Date of Patent: Jul. 17, 2001

(54) BICYCLE WARNING DEVICE CAPABLE OF PROVIDING A TURNING OR BRAKING SIGNAL

(76) Inventor: Jui-Chan Sung, 15, Lane 49, Her Tzuoh St., Taichung (TW)

( * ) Notice: Subject to any disclaimer, the term of this patent is extended or adjusted under 35 U.S.C. 154(b) by 0 days.

(21) Appl. No.: 09/182,784

(22) Filed: Oct. 30, 1998

(30) Foreign Application Priority Data

Nov. 26, 1997 (TW) ................................................ 86219754

(51) Int. Cl.$^7$ ............................... G01F 7/02; G01F 9/30; G01F 11/30; G01F 19/02; G01F 21/04
(52) U.S. Cl. ..................... 116/35 R; 116/316; 116/28 R; 116/63 P; 116/306; 116/51; 116/307; 116/46; 40/492; 40/493; 40/590; 40/68
(58) Field of Search .................... 116/28 R, 30, 116/35 R, 36, 46, 51, 63 R, 63 P, 306, 307, 316; 40/492, 493, 590

(56) References Cited

U.S. PATENT DOCUMENTS

| D. 414,816 | * | 10/1999 | Saunders .................................. 40/590 |
| 1,016,575 | * | 2/1912 | Meinhardt .............................. 116/316 |
| 1,340,081 | * | 5/1920 | Rabbitt ................................... 116/51 |
| 1,366,739 | * | 1/1921 | McClure ................................. 116/51 |
| 1,630,730 | * | 5/1927 | Daugherty ............................... 116/12 |
| 1,840,213 | * | 1/1932 | Schon .................................... 116/46 |
| 2,787,975 | * | 4/1957 | Dunn .................................. 116/63 R |
| 3,491,717 | * | 1/1970 | Vincent et al. ........................ 116/307 |
| 3,982,771 | * | 9/1976 | Tropeano ............................. 116/35 R |
| 4,063,377 | * | 12/1977 | Hukill ...................................... 40/68 |
| 4,318,238 | * | 3/1982 | Marcarle, Jr. ........................ 116/63 P |
| 5,257,020 | * | 10/1993 | Morse ................................. 340/908.1 |
| 5,680,121 | * | 10/1997 | Shiozaki et al. .................. 340/908.1 |
| 5,918,924 | * | 7/1999 | Cowan .................................... 40/591 |

FOREIGN PATENT DOCUMENTS

| 2306490 | * | 8/1973 | (DE) ..................................... 116/306 |
| 961091 | * | 6/1964 | (GB) ................................... 116/63 R |
| 414004 | * | 6/1946 | (IT) ...................................... 116/306 |
| 530055 | * | 12/1972 | (SE) ..................................... 116/309 |

OTHER PUBLICATIONS

16293, Faulkners' Complete Specification, 1909.*
176,414. Complete specification, Date unknown.*
362,156. Complete specification, Date unknown.*
305,062. Complete specification, Date unknown.*
323 057. Complete specification. Date unknown.*

* cited by examiner

Primary Examiner—G. Bradley Bennett
Assistant Examiner—Gail Verbitsky
(74) Attorney, Agent, or Firm—Raymond Y. Chan; David and Raymond Patent Group (57) ABSTRACT

A bicycle warning device is capable of providing a turning or braking signal and is mounted on the bicycle such that the main body of the warning device faces the front and the rear of the bicycle. The main body is provided with at least two groups of reflector-type display pieces which are of a strip like construction and arranged alternately in rows. The display pieces are provided with symbols capable of forming in combination to indicate the turning direction or the braking action of the bicycle in motion. The display pieces are colored to enhance the warning effect of the device and are capable of being driven by the pull rods to displace up and down. The effects of the left-turn signalling, the right-turn signalling and the braking signalling are attained by the alternate and reciprocating motions of the display pieces.

3 Claims, 10 Drawing Sheets

BICYCLE WARNING DEVICE CAPABLE OF PROVIDING A TURNING OR BRAKING SIGNAL

FIELD OF THE INVENTION

The present invention relates generally to a bicycle warning device capable of providing a turning o r braking signal, and more particularly to a bicycle warning device which is mounted on a predetermined position of the bicycle frame such that the warning device faces forward and backward in relation to the bicycle. The warning device is composed of at least two long strip like colored reflector-type display pieces, which are arranged alternately and provided respectively with a symbol, word, or figure capable of indicating the turning or braking motion of the bicycle. Each of the display pieces can be driven to move up and down by a pull rod which is located behind the display piece. The display pieces are capable of an alternate motion repeatedly to bring about a turning or braking signal so as to enhance the safety of the bicycle.

BACKGROUND OF THE INVENTION

The conventional bicycle warning devices in existence are generally grouped into two categories, which are described hereinafier.

The reflector is mounted on the bicycle such that the reflector is capable of reflecting the light existing in the environment so as to warn the operators of vehicles as well as the pedestrians. The reflector is incapable of providing a turning or braking signal. As a result, the bicyclist must use his or her hand to signal his or her intention to turn left or right. Without being equipped with a braking warning device, a bicycle is prone to cause a traffic incident at the time when the bicycle in motion is stopped without an advance warning.

Another kind of the warning device is composed of an electrically-driven light-emitting element, such as LED (light emitting diode). The operation of the warning device is controlled by a power source switch.

Such conventional warning devices as described above are defective in design in that they do not work effectively, and that their efficiency may be undermined by the poor working condition of the battery.

SUMMARY OF THE INVENTION

The primary objective of the present invention is to provide a bicycle warning device capable of providing a turning or braking signal to safeguard the bicycle in motion as well as the bicyclist. The warning device is mounted on a predetermined position of the bicycle such that the warning device faces forward and backward in relation to the bicycle. The warning device is composed of at least two long strip like colored reflector-type display pieces, which are arranged alternately and provided respectively with a symbol, word, or figure capable of indicating the turning or braking motion of the bicycle. Each of the two display pieces can be driven to move up and down by a pull rod which is located behind the display piece. The two display pieces are capable of an alternate motion repeatedly to bring about a turning or braking signal so as to enhance the safety of the bicycle.

DETAILED DESCRIPTION OF THE EMBODIMENTS

As shown in FIGS. 1–4, a bicycle warning device embodied in the present invention is composed of component parts which are described hereinafter.

A main body 10 of a hollow box like construction is provided with at least one hollow receiving compartment which is provided in one side thereof with a present window 11, a frame like fixed display plate 12, and a plurality of thin first display pieces 13 which are made of a pliable material and are of a grating construction The first display pieces 13 are fastened with one side of the display plate 12 such that the first display pieces 13 face the window 11, and that the first display pieces 13 are parallel to one another and are equidistantly located, and further that two adjoining display pieces 13 are separated by a gap 121.

Figure 2:
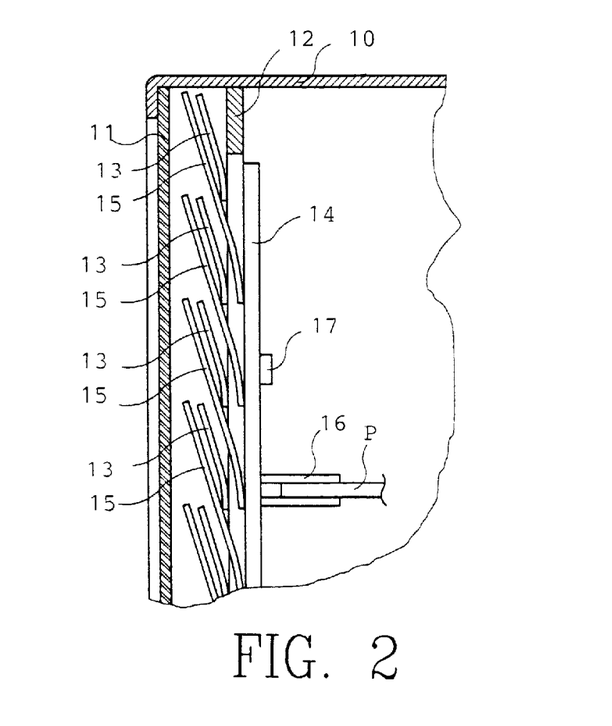
FIG. 2 shows a side schematic view of the first preferred embodiment of the present invention.
Figure 3:
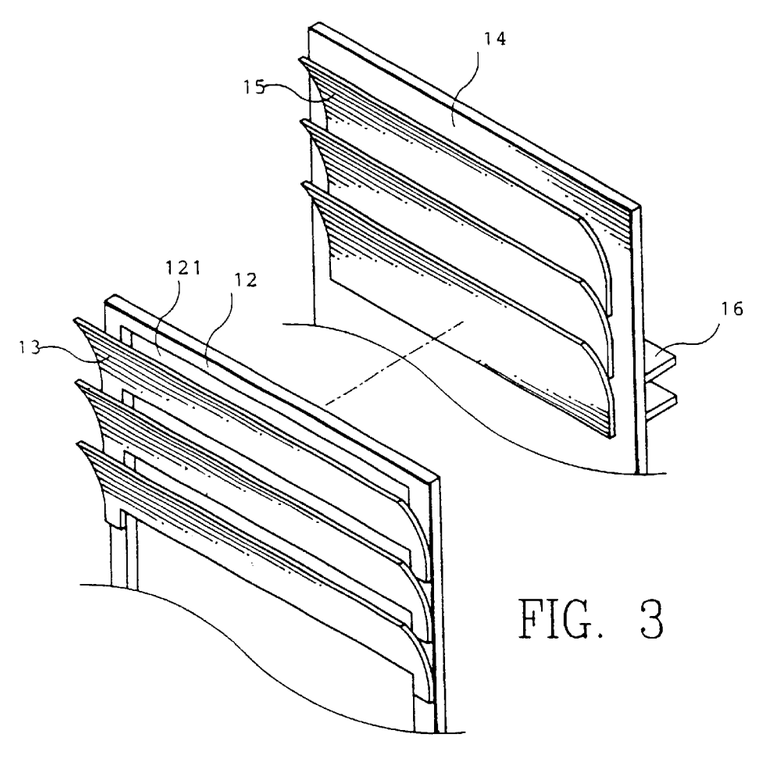
FIG. 3 shows an exploded view of a warning device of the first preferred embodiment of the present invention.
Figure 8:
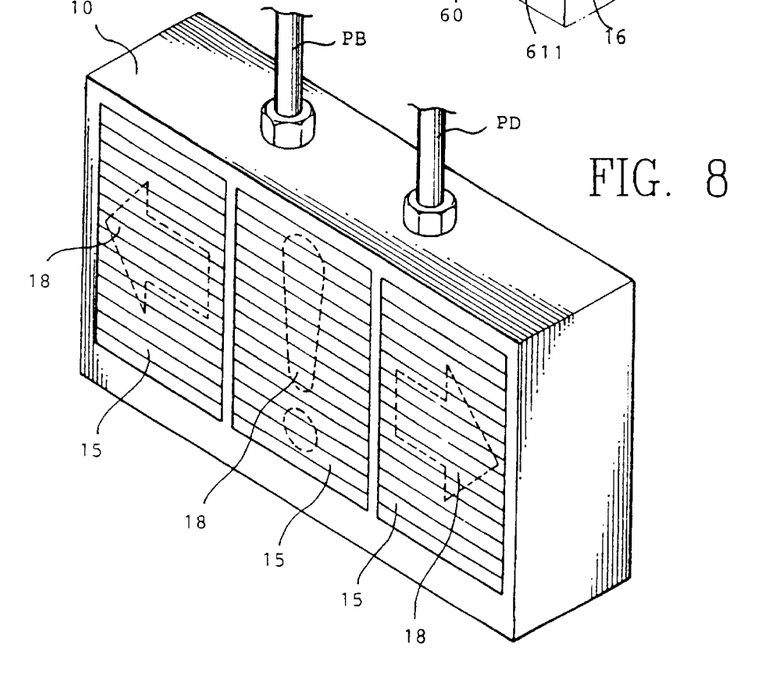
FIG. 8 shows a perspective of a second preferred embodiment of the present invention.

A movable display plate 14 is located between the fixed display plate 12 and two protrusions 17 of two opposite sides of the receiving compartment such that the movable display plate 14 is capable of moving up and down. The movable display plate 14 is provided in the rear side thereof with a pulled portion 16 opposite to one side of the fixed display plate 12. The movable display plate 14 is provided with a plurality of thin second display pieces 15 which are made of a pliable material and are arranged equidistantly such that the width of a gap between two adjoining second display pieces 15 should not be greater that the gap between two adjoining first display pieces 13, so as to enable the second display pieces 15 to be inserted into the gaps 121 in a superimposing manner. Each of the second display pieces 15 is marked with a turning or braking symbol 18 (as shown in FIG. 8) capable of reflecting light. The symbol 18 is similar in color to the first display piece 13 so as to be easily recognized. When the movable display plate 14 is located at a down position, the second display pieces 15 are longer than the first display pieces 13. Before the second display pieces 15 are lifted, the upper ends of the second display pieces 15 can not be higher than the top ends of the first display pieces 13, as shown in FIG. 2.

Figure 1:
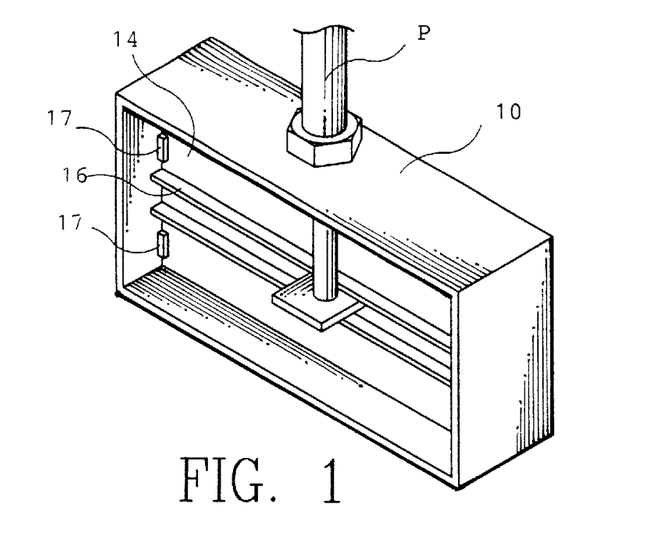
FIG. 1 shows a perspective view of a first preferred embodiment of the present invention.

The movable display plate 14 is provided in the back side thereof with a pulled portion 16 capable of being caused by a tension element P to bring about a tension action . As a result, both the pulled portion 16 and the tension element P have a simultaneous displacement effect, as shown in FIG. 1 . On the other hand, both the pulled portion 16 and the tension element P are capable of a sliding motion in relation to each other, thereby enabling the tension element P to cause the pulled portion 16 to bring about an up-and-down displacement effect, as shown in FIGS. 2 and 4.

Figure 5:
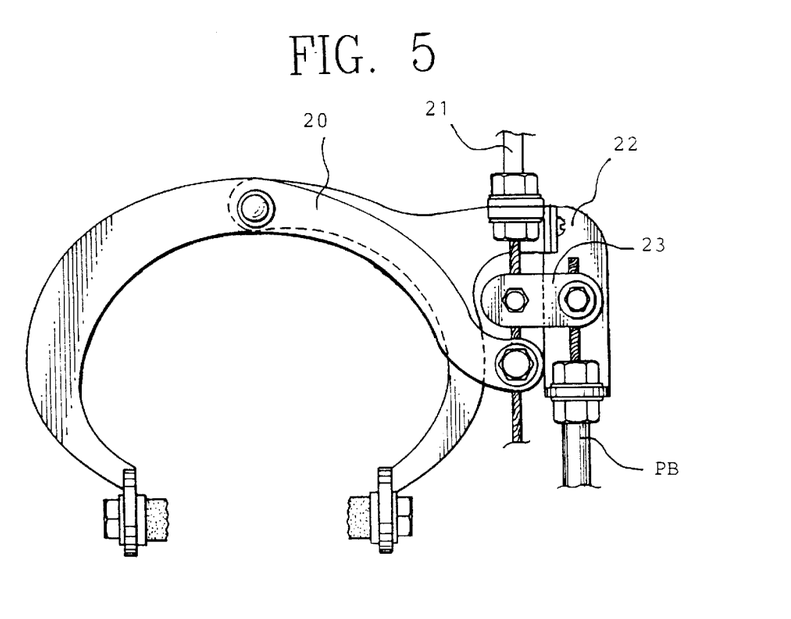
FIG. 5 shows a schematic view of a bicycle braking device.

The warning device of the present invention can be fastened with a bicycle frame or a bicycle handlebar such that another end of the tension element P is so extended to connect directly or indirectly with a brake cable 21 of the bicycle brake 20, as shown in FIG. 5. The tension element P can be also connected at another end thereof with the handlebar . The tension element P may be a brake cable or a cable for controlling the turning indicator.

Figure 4:
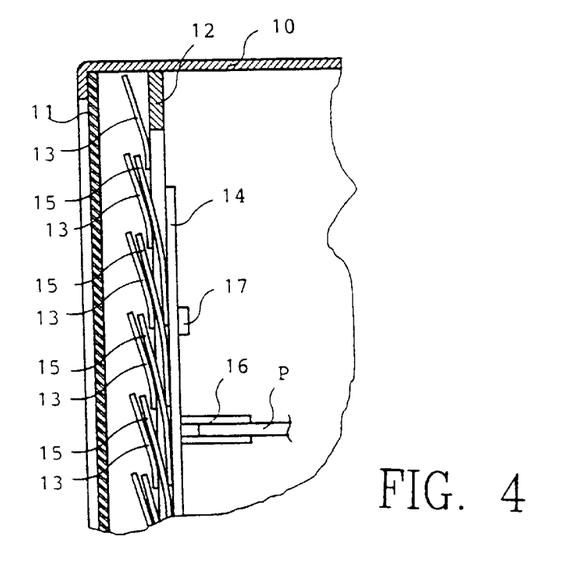
FIG. 4 shows the side schematic view of the first preferred embodiment of the present invention at work.

As shown in FIG. 4, when the tension element P is pulled upwards, the movable display plate 14 and the second display pieces 15 are lifted such that the second display pieces 15 are no longer concealed by the first display pieces 13, and that the second display pieces 15 are thus visible, and further that the first display pieces 13 are concealed by the second display pieces 15. As a result, the symbols 18 of the second display pieces 15 are perceptible to the naked eye to attain the intended purpose .

The warning device of the present invention can be mounted in various directions or at various angles such that the first display pieces 13 and the second display pieces 15 can be caused to displace horizontally.

The embodiments of the present invention are provided with at least two tension elements P, one of which is a brake cable PB for controlling the braking signal, and other one of which is a turning cable PD of controlling the turning signal.

As shown in FIG. 5, the tension element P may be fastened with a braking device 20 such that the tension element is a brake cable PB which is located by a connection piece 22. The brake cable PB and a brake line 21 are fastened by a fastening piece 23 so as to enable the brake cable PB and the brake line 21 to displace simultaneously.

Figure 6:
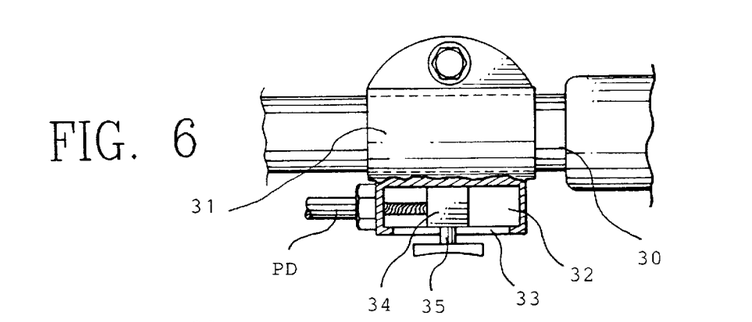
FIG. 6 shows a partial sectional view of a turning signal operating structure of the present invention.
Figure 7:
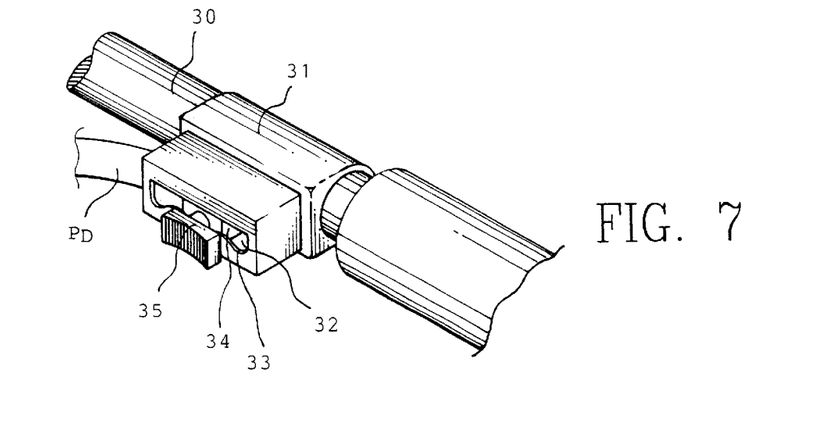
FIG. 7 shows a perspective view of the turning signal operating structure of the present invention as shown in FIG. 6.

As shown in FIGS. 6 and 7, the tension element P may be fastened with a switching seat 31 of the handlebar 30 such that the tension element is a turning cable PD. The switching seat 31 has a terminal 34 extending from the end of the turning cable PD, and a hollow receiving compartment 32. The terminal is provided in other side with a push portion 35 capable of jutting out of the receiving compartment 32, and a locating slot 33 located at the outlet of the receiving compartment 32, so as to provide a retaining effect at the time when the push portion 35 of the turning cable PD is pushed. When the terminal 34 is pushed to displace, the second display pieces 15 are pulled by the turning cable PD to move up and down such that the symbols 18 can be seen to show the turning direction.

The locating slot 33 has a corrugated edge, which may be replaced with a plate like elastic piece or an equivalent body.

Figure 9:
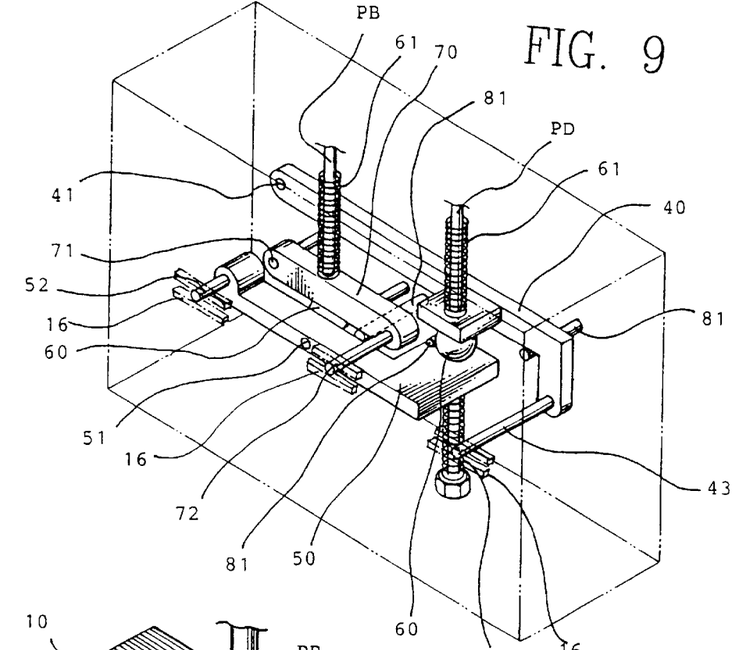
FIG. 9 shows a schematic view of the internal construction of the second preferred embodiment of the present invention.

As shown in FIGS. 8 and 9, an embodiment of the present invention is provided with "braking", "left turn", and "right turn" signaling effects which are operated separately. In other words, the main body 10 consists of a fixed display plate 12, a movable display plate 14, and the first display pieces 13 and 15 having symbols 18, which are operated independently . The display pieces, which are marked with the symbol 18 "braking", the symbol 18 "left turn", the symbol 18 "right turn ", are independent of one another . The main body 10 is provided with the braking effect and is located at the center of the vehicle body The main body 10 which is provided with "left turn", is located at the left side of the vehicle body, whereas, the main body 10, which is provided with "right turn",is located at the right side of the vehicle body.

In addition, the movable display plate 14 is provided in the rear side thereof with a transmission device comprising:

a right turn connection rod 40 located horizontally on the rear side of the movable display plate 14 and fastened with the main body 10 by a shaft 41 such that the connection rod is capable of swinging only from another end, and that the movable end thereof is provided with a pull rod 43 capable of driving the movable display plate 14 to move up and down. The turning cable PD is provided with a spring 61 to provide a pressing effect. Located in proximity of the movable end is a retaining portion 81 capable of keeping the right turn connection rod 40 on a horizontal position. The right turn connection rod 40 is capable of an upward reciprocating motion only from the position of the retaining portion 81;

a left turn connection rod 50 located horizontally on the rear side of the movable display plate 14 and located in proximity of the central position of the underside of the right turn connection rod 40. The left turn connection rod 50 is located on the main body 10 by a shaft 51 such that both ends of the left turn connection rod 50 are capable of swinging in a reciprocating manner. The left turn connection rod 50 is provided with a pull rod 52 corresponding in direction to the shaft 41 and capable of driving the corresponding movable display plate 14 to move up and down. The left turn connection rod 50 is further provided at other end thereof with a retaining portion 81 capable of keeping the left turn connection rod 50 to remain at the horizontal state. The pull rod 52 end of the left turn connection rod 50 is capable of an upward reciprocating motion only from the position of the retaining portion 81;

a turning cable PD traversing between the retaining portions 81 of the left turn connection rod 40 and the right turn connection rod 50, and capable of moving in relation to each other. The turning cable PD is provided between the two connection rods 40 and 50 with an urging portion 60 of a spherical columnar construction, and is further provided respectively at the opposite back sides of the two connection rods 40 and 50 with a compression spring 61 and a retrieval spring 611. When the turning cable PD is moved up and down repeatedly, the two connection rods 40 and 50 are caused to bring about an upward urging motion or a downward urging motion. The compression spring 61 and the retrieval spring 611 serve to enable the two connection rods 40 and 50 to return to their original position after the two connection rods 40 and 50 have displaced upwards or downwards;

a braking connection rod 70 located horizontally between the two connection rods 40 and 50, with one end thereof being pivoted to a shaft 71 which is connected with the main body 10, with another end thereof being capable of turning upwards and downwards freely. The movable end is fastened with the main body 10 by a retaining portion 81 for confining the connection rod 70 to move upward from the horizontal position by a fixed end thereof serving as an axis. The movable end is provided with a pull rod 72 for controlling the up-and-down motion of the movable display plate 15 so as to bring about the warning effect of the symbols 18 indicating the braking state.

A brake cable PB has one end longitudinally engaged with a midsection of the braking connection rod 70 such that they are capable of moving in relation to each other. The brake cable PB has another end is extended to connect with the braking device 20 such that the brake cable PB is capable of acting along with the brake shoes at the same time. The brake cable PB is provided at the lower side thereof with an urging portion 60 of a spherical columnar construction, by means of which the braking connection rod 70 is caused to swing up and down when the brake cable PB is moved up and down repeatedly. The pull rod 72 of the end thereof causes the movable display plate 15 to move up and down to attain the warning effect of the symbols 18 indicating the braking state;

In addition, the braking connection rod 70 is provided with a compression spring 61 for enabling the movable display plate 15 to return to its original position after the movable display plate 15 has moved upwards.

The aforementioned springs 61 and 611 may be replaced with a plate like spring or similar elastic element.

For the combination of the components described above, please refer to FIGS. 9 and 10. When the bicycle is moving forward, the terminal 34 of the end of the turning cable PD may be located at the center of the locating slot 33 of the switching seat 31 such that the left turn connection rod 50 and the right turn connection rod 40 are in a horizontal and stationary state.

Figure 10:
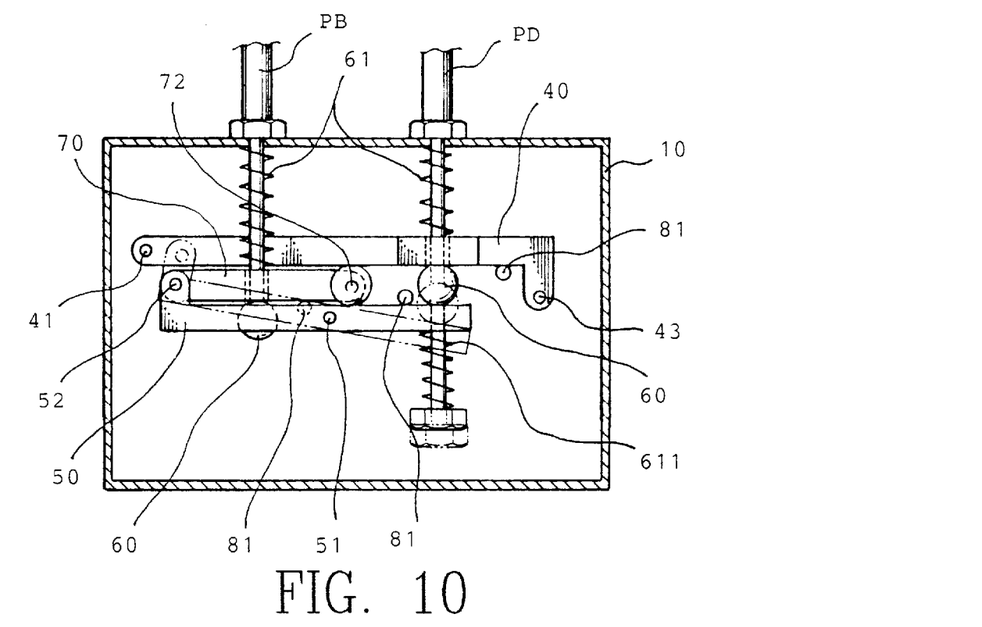
FIG. 10 shows a side schematic view of the second preferred embodiment of the present invention at work.

If a left turn is desired, the push portion 35 of the switching seat 31 of the handlebar 30 is activated to push the terminal 34 to displace leftwards, thereby resulting in the downward displacements of the turning cable PD and the urging portion 60 which forces the left turn connection rod 50 to turn clockwise on the shaft 51 acting as an axis. The pull rod 52 of another end acts to cause the movable display plate 14 to move upwards, thereby causing the second display pieces 15 to be free from the obstruction of the first display pieces 13. As a result, the second display pieces 15 are visible such that the first display pieces 13 are concealed by the second display pieces 15, and that the second display pieces 15 can be seen through the window 11 such that the symbols 18 of the second display pieces 15 are seen to indicate "left turn".

In order to eliminate the "left turn" signal, the above-mentioned operation is carried out in reverse such that the movable display plate 14 and the second display pieces 15 are caused to displace downwards, and that the second display pieces 15 are once again concealed by the first display pieces 13.

Figure 11:
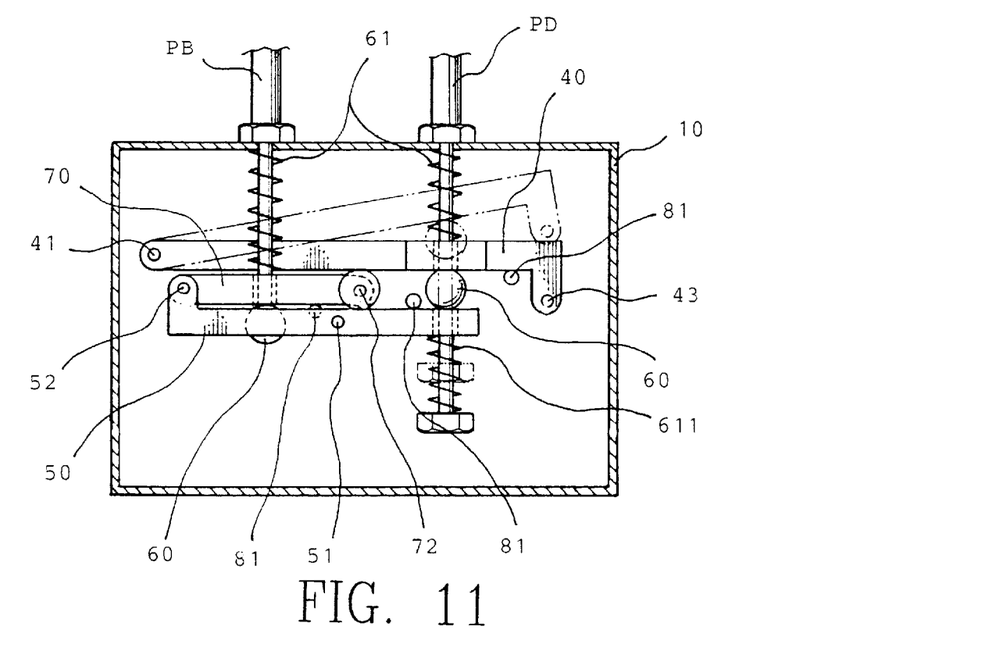
FIG. 11 shows another side schematic view of the second preferred embodiment of the present invention at work.

As shown in FIG. 11, a right turn signal can be initiated by activating the push portion 35 of the switching seat 31 of the handlebar 30 such that the terminal 34 is displaced rightwards, and that the turning cable PD and the urging portion 60 are displaced upwards together, thereby resulting in the urging portion 60 to urge upwardly the right turn connection rod 40 such that the right turn connection rod 40 is caused to turn counterclockwise on the shaft 41 acting as an axis, and that the pull rod 43 of the movable end thereof pulls the movable display plate 14 to move upwards, and further that the second display pieces 15 are no longer concealed by the first display pieces 13. As a result, the symbols 18 of the second display pieces 15 are seen through the window 11 to indicate "right turn".

The "right turn" signal described above can be eliminated by carrying out the above-described operation in reverse such that the movable display plate 14 and the second display pieces 15 are caused to displace downwards, and that the second display pieces 15 are once again concealed by the first display pieces 13.

When the "turning" operation is at work, the components in connection with the "braking" operation do not take part in the "turning" operation.

Figure 12:
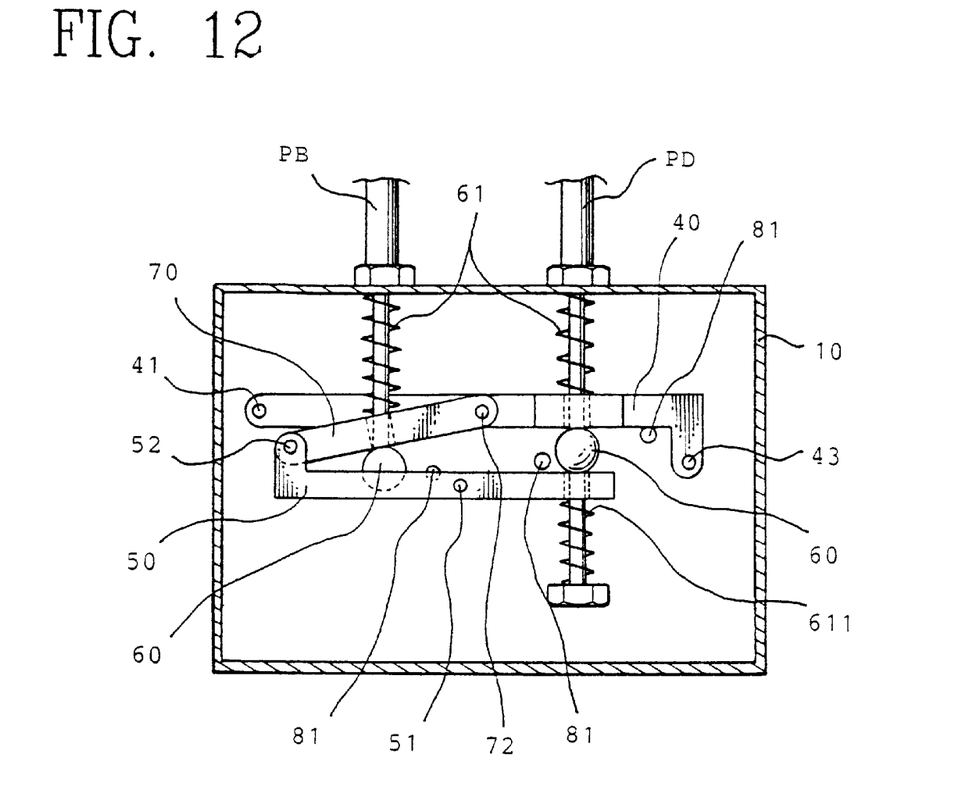
FIG. 12 shows still another side schematic view of the second preferred embodiment of the present invention in action.

As shown in FIG. 12 in conjunction with FIG. 5, the operation of the braking signal can be activated by triggering the braking device 20 such that the brake line 21 is pulled upwardly to result in the upward displacement of the braking cable PB. In the meantime, the braking connection rod 70 is urged by the urging portion 60 to swing upwards such that the pull rod 72 is at work to pull the movable display plate 14 to displace upwards, and that the second display pieces 15 are no longer concealed by the first display pieces 13. As a result, the symbols 18 of the second display pieces 15 are visible through the window 11 to indicate "braking".

The "braking" signal described above can be cancelled by carrying out the above-described operation in reverse such that the movable display plate 14 and the second display pieces 15 are displaced downwards, and that the second display pieces 15 are once again concealed by the first display pieces 13.

Figure 13:
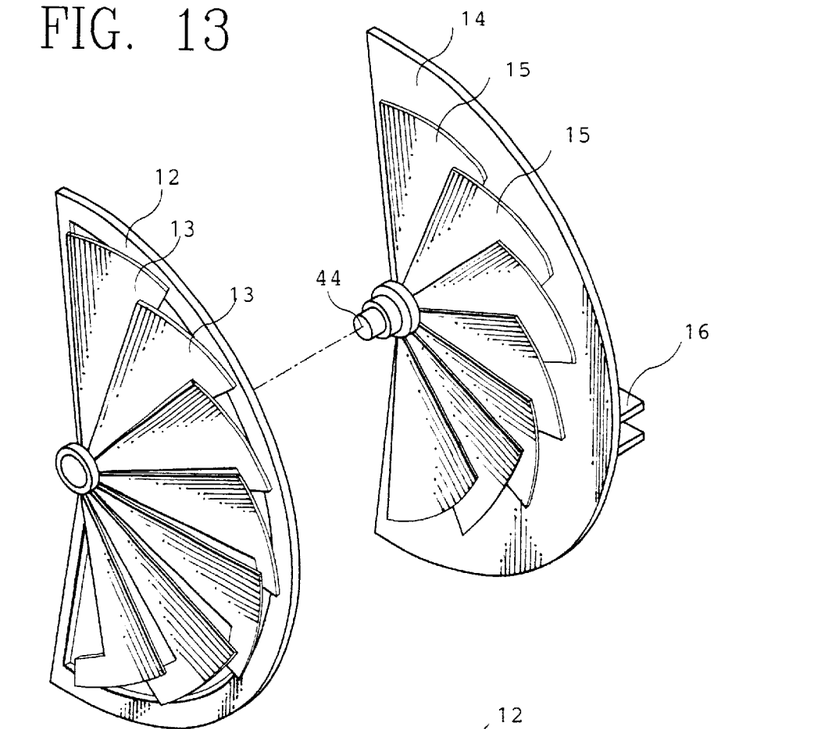
FIG. 13 shows an exploded view of a warning device of a third preferred embodiment of the present invention.
Figure 14:
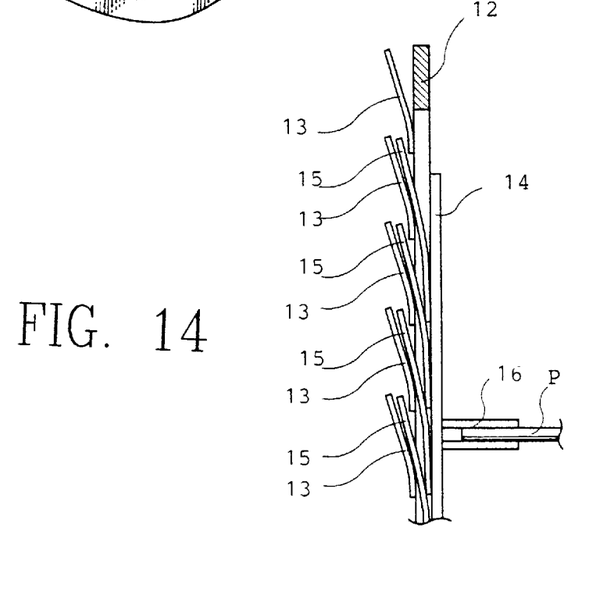
FIG. 14 shows a side schematic view of the third preferred embodiment of the present invention.

As shown in FIGS. 13 and 14, the strip like first display pieces 13 and the strip like second display pieces 15 may be of an arcuate construction and superimposed alternately to form a sect oral object which is provided at the center thereof with a rotary shaft 44 which is in turn fastened with the main body 10. As a result, the movable display plate 14, which is located behind the fixed display plate 12, is capable of turning in the main body 10 such that the second display pieces 15 of the movable display plate 14 are capable of being seen or being concealed by the first display pieces 13 which are in the state of being superimposed alternately.

As shown in FIG. 13-19, the present invention is provided with arcuate first and second display pieces 13 and 15, which are superimposed alternately to form a sectoral object which is provided at the circle center thereof with a rotary shaft 431, 44 fastened with the main body 10 for operating separately "braking signal", "left turn signal", and "right turn signal". In other words, the symbols 18 of the first display pieces 13 and the second display pieces 15 of the fixed display plate 12 and the movable display plate 14 are independently marked with "braking", "left turn", and "right turn". The control receiving compartment having the braking effect is located at the center of the main body 10, whereas the semicircular control receiving compartment having the "left turn" signal is located at the left side of the main body 10. The semicircular control receiving compartment having the "right turn" signal is located at the right side of the main body 10.

Figure 16:
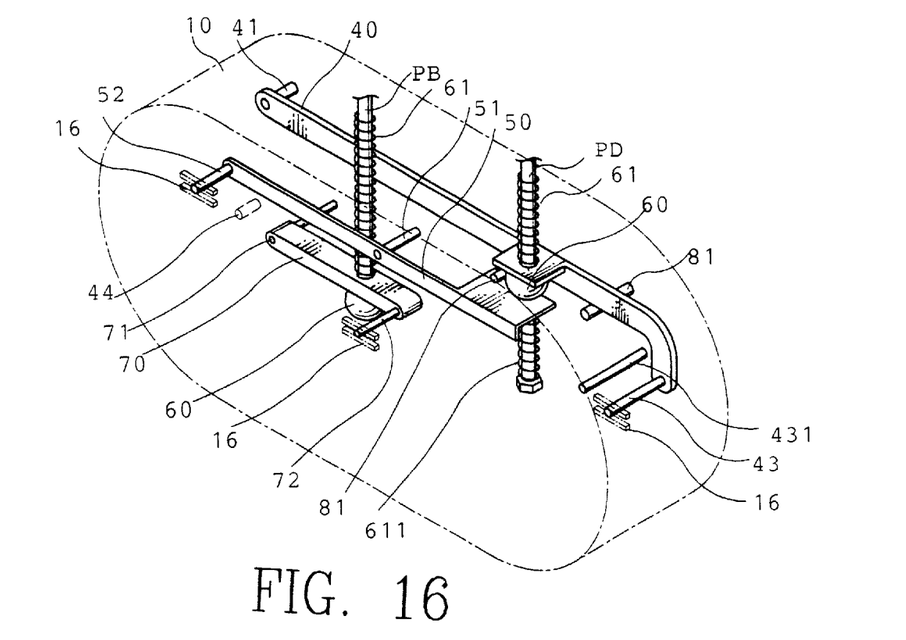
FIG. 16 shows a schematic view of the in tern al construction o the fourth preferred embodiment of the present invention.
Figure 17:
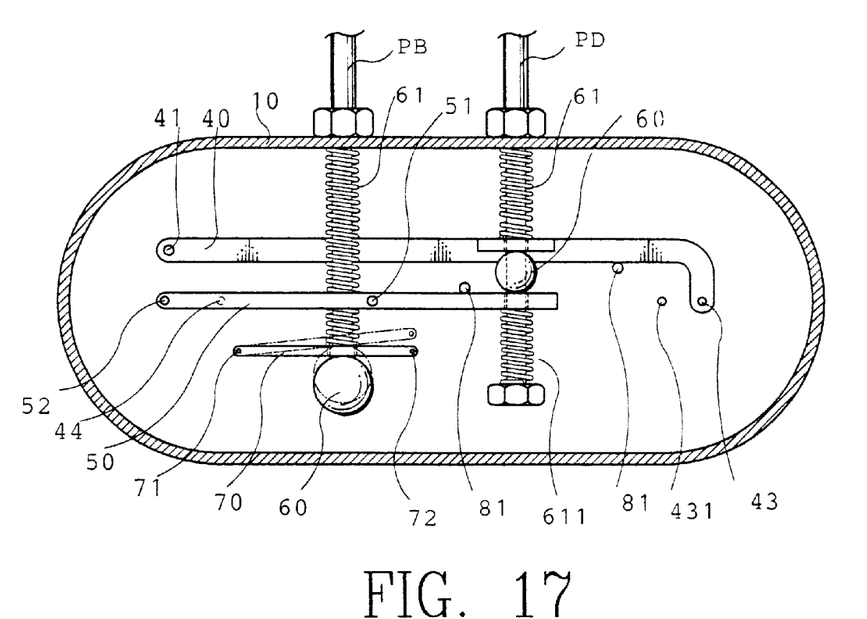
FIG. 17 shows a side schematic view of the fourth preferred embodiment of the present invention in action.

In other to attain the alternate display effect of the above-mentioned first and second display pieces 13 and 15, the present invention is provided with a transmission device which is located behind the movable display plate 14 connected with the second display pieces 15. The transmission device consists of components which are described hereinafter.

A right turn connection rod 40 is located horizontally behind the movable display plate 14 and is fastened at the left end thereof with the main body 10 by a shaft 41. The right turn connection rod 40 is provided at another end thereof with a pull rod 43 which is pivoted to a pulled portion 16 located behind the movable display plate 14. The right turn connection rod 40 is capable of swiveling on the shaft 41 acting as an axis. A turning cable PD is provided between the main body 10 and the right connection rod 40 with a spring 61 capable of pressing the right turn connection rod 40. The turning cable PD is further provided with an urging portion 60 capable of urging upwardly the right turn connection rod 40. Located under the right turn connection rod 40 and the movable end is a retaining portion 81 for keeping the right turn connection rod 40 to remain in the horizontal state. The right turn connection rod 40 is capable of moving upwards in a reciprocating manner only from the position of the retaining portion 81.

A rotary shaft 431 is fastened pivotally with the main body 10. The movable display plate 14 and the second display pieces 15 are capable of swinging up and down on the rotary shaft 431 acting as an axis.

A left turn connection rod 50 is located horizontally behind the movable display plate 14 and is fastened at the midsection thereof with the main body 10 by a pivot 51. The left turn connection rod 50 is provided at the outer end thereof with a pull rod 52 which is pivoted to a pulled portion 16 located behind the movable display plate 14. The left turn connection rod 50 is capable of swiveling on the pivot 51 and is connected with a turning cable PD corresponding in location to another movable end of a pulling member 441 such that the upper side is pressed by the urging portion 60, and that the lower side is provided with a retrieval spring 611 which is fitted over the turning cable PD for urging the left turn connection rod 50 upwardly. The left turn connection rod 50 is capable of driving the movable display plate 14 to swing up and down in a reciprocating manner by means of its pull rod 52, so as to bring about the left turn signalling effect.

Located at one side of the movable end of the left turn connection rod 50 is a retaining portion 81 for confining the pull rod 52 of the left turn connection rod 50 to remain in the horizontal state and to move upwardly in a reciprocating manner, so as to bring about the left turn signalling effect.

A turning cable PD is located longitudinally between the left and the right connection rods 40 and 50, which are capable of moving in relation to each other. When the turning cable PD is moved up and down in a reciprocating manner, the left and the right turn connection rods 40 and 50 are urged upwards or downwards for bringing about the signalling effect of the symbols 18. The left and the right turn connection rods 40 and 50 are provided with a compression spring 61 and a retrieval spring 611 for enabling the connection rods 40 and 50 to return to their original positions after the connection rods 40 and 50 have been displaced upwardly or downwards.

A braking cable PB has one end which is longitudinally put through the midsection of the braking connection rod 70. The brake cable PB has another end which is connected with the braking device 20. Located under the brake cable PB is a spherical columnar urging portion 60 capable of moving up and down to bring about the up-and-down motion of the braking connection rod 70. A pull rod 72 is inserted into the pulled portion 16 of the movable display plate 14 for urging the movable display plate 14 to bring about the effect of braking signal of the symbols 18.

The braking connection rod 70 is fitted into a compression spring 61 for pushing the right turn and the left turn connection rods 40 and 50 to move up or down for attaining the left turn signalling and the right turn signalling of the symbols 18. The connection rods 40 and 50 are capable of returning to their original position after the upward displacement or the downward displacement, thanks to the compression spring 61 and the retrieval spring 611.

A braking cable PB has one end which is longitudinally put through the midsection of the braking connection rod 70. The brake cable PB has another end which is connected with the braking device 20. Located under the brake cable PB is a spherical columnar urging portion 60 capable of moving up and down to bring about the up-and-down motion of the braking connection rod 70. A pull rod 72 is inserted into the pulled portion 16 located at the rear side of movable display plate 14 for urging the movable display plate 14 to bring about the braking signalling effect of the symbols 18.

The braking connection rod 70 is fitted into a compression spring 61 which acts to enable the movable display plate 15 to return to an original position thereof after the movable display plate 15 is displaced upwardly.

As shown in FIGS. 5–7, when the bicycle is cruising, the terminal 34 of the end of the turning cable PD is located at the center of the locating slot 33 of the switching seat 31 so as to keep the left turn and the right turn connection rods 40 and 50 to remain almost in the horizontal and stationary state.

Figure 15:
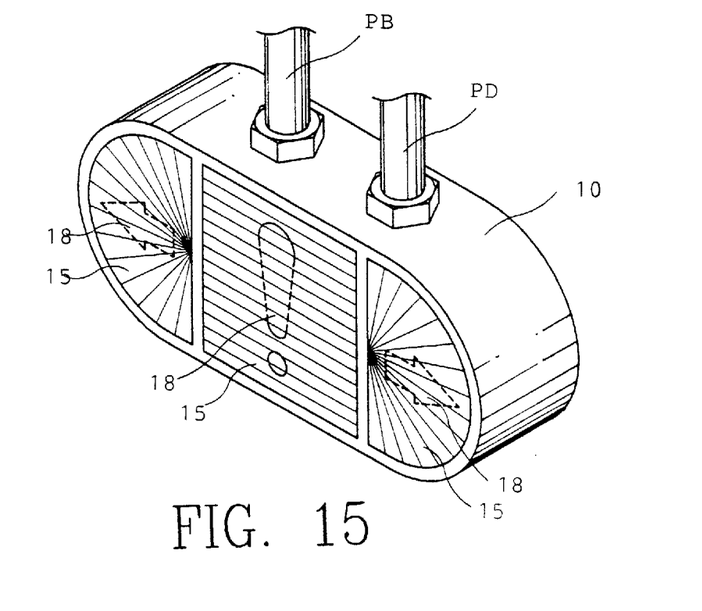
FIG. 15 shows a perspective view of a fourth preferred embodiment of the present invention.
Figure 19:
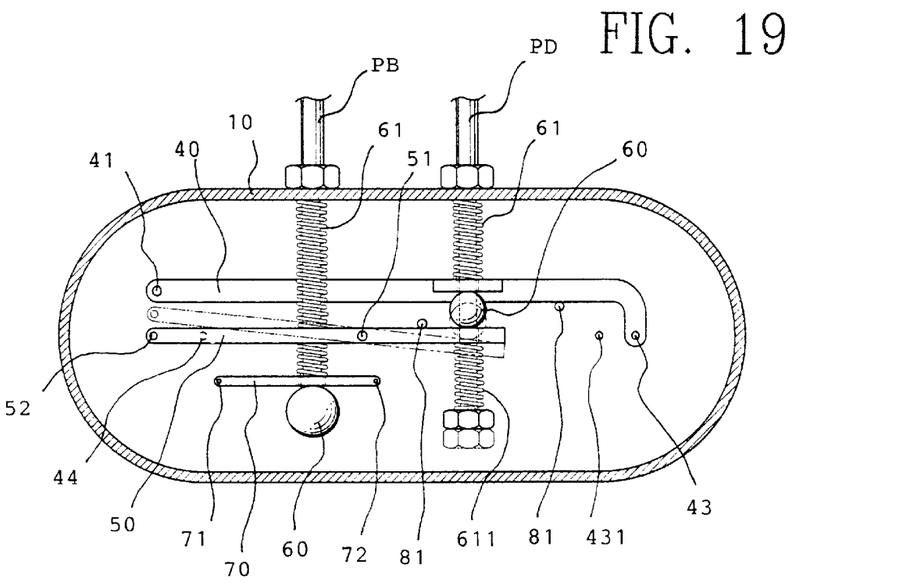
FIG. 19 shows still another side schematic view of the fourth preferred embodiment of the present invention in action.

As shown in FIGS. 15, 16 and 19, the effect of the braking signalling is brought about whenever the braking device 20 is triggered in view of the fact that the brake line 21 is pulled upwards, and that the braking cable PB is actuated to displace upwards, and further that the braking connection rod 70 is urged to swing upwards by the urging portion 60. As a result, the second display pieces 15 of the movable display plate 14 are no longer concealed by the first display pieces 13 and can be seen through the window 11, thereby bringing about the braking signalling effect of the symbols 18 of the second display pieces 15.

The braking signal can be cancelled by carrying out the above operation in reverse such that the movable display plate 14 and the second display pieces 15 are displaced downwards, and that the second display pieces 15 are once again concealed by the first display pieces 13. When the braking signalling effect is brought about, the mechanism of turning signalling remains inactive.

As shown in FIGS. 6, 7, 13, 16, and 18, when the urging portion 35 of the switching seat 31 of the handlebar 30 is activated to push the terminal 34 to displace rightwards, the turning cable PD and the during potion 60 are urged to move upwards such that the right turn connection rod 40 is pushed by the urging portion 60 to turn counterclockwise on the shaft 41 acting as an axis. In the meantime, the pull rod 43 of the movable end pulls the movable display plate 14 upwards, thereby resulting in the second display pieces 15 of the movable display plate 14 being visible through the window 11, . As a result, the right turn signalling effect is brought about.

Figure 18:
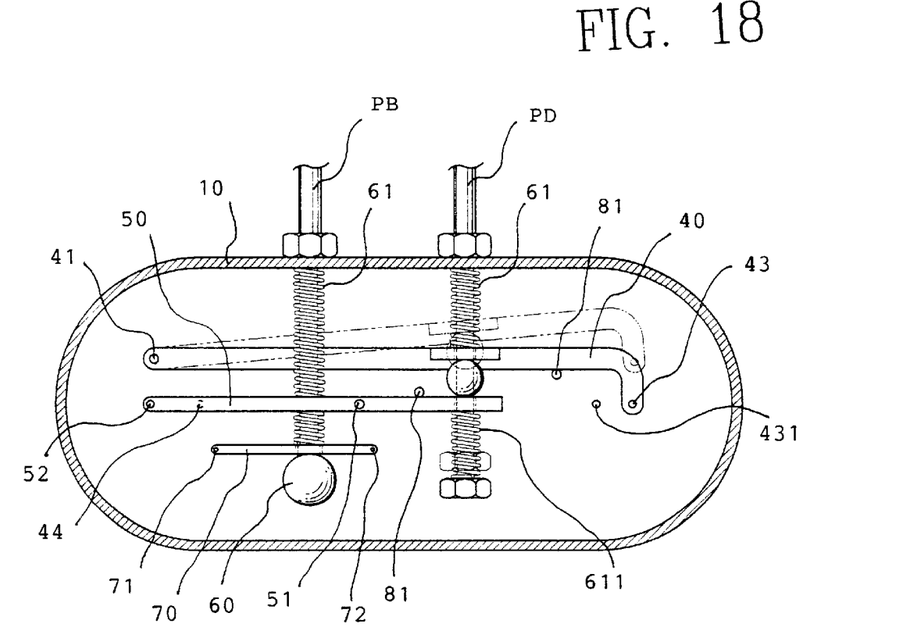
FIG. 18 shows an other side schematic view of the fourth preferred embodiment of the present invention in action.

The right turn signalling effect can be cancelled by carrying out the above process in reverse such that the movable display plate 14 and the second display pieces 15 are displaced downwards, and that the second display pieces 15 and the symbols 18 are once again concealed by the first display pieces 13.

As shown in FIGS. 6, 7, 13, 16, and 19, the left turn signalling effect is brought about by activating the push portion 35 of the switching seat 31 of the bicycle handlebar 30 such that the terminal 35 is displaced leftwards, and that the turning cable PD and the urging portion 60 are displaced downwards and further that the left turn connection rod 50 is pushed downwards by the urging portion 60. As a result, the pulled portion 16 of the movable display plate 14 is actuated by the pull rod 52 such that the movable display plate 14 and the second display pieces 15 are caused to turn clockwise on the rotary shaft 44 acting as an axis, and that the second display pieces 15 are no longer concealed by the first display pieces 13 so as to be visible through the window 11. The left turn signal formed by the combination of the symbols 18 of the second display pieces 15 is thus visible through the window 11.

The left turn signal can be cancelled by carrying out the above process in reverse such that the movable display plate 14 and the second display pieces 15 are displaced downwards, and that the second display pieces 15 are once again concealed by the first display pieces 13.

When the left turn signalling effect or the right turn signalling effect is brought about, the braking signalling mechanism remains inactive.

The embodiments of the present invention have been tested in the field, with the test results being far superior to those of the prior art devices. The present invention has advantages which are described hereinafter.

The present invention can be operated manually without electricity and is simple in construction and cost-effective.

The present invention eliminates the old-fashioned hand signalling which is often hazardous to the safety of a bicyclist. The present invention allows the bicyclist to operate the bicycle with both hands even when the bicycle is about to make a turn.

The braking signal warning device can be operated easily and separately from the braking action. The warning symbols of the first and the second display pieces may be colored differently or provided with a reflective quality to enhance the signalling effect as well as the safety of the operator of the vehicle.

The turning signal warning device of the present invention can be easily operated with one finger of the operator hand.

What is claimed is:

1. A bicycle warning device capable of providing a turning or braking signal and being mounted on a bicycle frame or a bicycle handlebar such that said bicycle warning device faces a front or a rear of a bicyclist, said bicycle warning device comprising:

a main body of a hollow box like housing and provided with at least one hollow receiving compartment which is provided in one side thereof with a see-through window, a fixed display plate of a frame like construction and fastened with said main body, and a plurality of first display pieces which are made of a pliable material and are of a strip like grating construction, said first display pieces being parallel to one another and fastened equidistantly with said fixed display plate such that said first display pieces face said window, and that a gap is provided between two of said adjoining first display pieces;

a movable display plate located between said fixed display plate and two protrusions provided in two opposite sides of said receiving compartment such that said movable display plate is capable of moving up and down, said movable display plate provided in a rear side thereof with a pulled portion capable of being pulled by a tension element, and a plurality of second display pieces which are made of a pliable material and are arranged equidistantly such that said second display pieces are opposite in location to said first display pieces, said second display pieces having a width which is not greater than a width of said gap between two of said first display pieces so as to enable said second display pieces to be inserted one by one into said gap in a superimposing manner, said second display pieces being marked thereon with symbols of a reflective quality and having a turning indicator or a braking indicator, said symbols being different in color from said first display pieces, said second display pieces being longer than said first display pieces when said movable display plate is displaced downwards, said second display pieces having an upper end which is located at a level not higher than a level at which a top end of said first display pieces is located; and a tension element connected with a brake line of a braking device of a bicycle or mounted on a control element of said bicycle handlebar such that said tension element drives said movable display plate and said second display pieces, and that said second display pieces are displaced to be no longer concealed by said first display pieces, and that said second display pieces are displaced to be concealed again by said first display pieces.

2. The bicycle warning device, as defined in claim 1, wherein said main body is further provided with a control receiving compartment for a braking effect, a control receiving compartment for a left turning effect, and a control receiving compartment for a right turning effect; wherein a transmission device is provided in a rear side of said movable display plate, said transmission device comprising:

a right turn connection rod located horizontally at said rear side of said movable display plate such that said right turn connection rod is fastened at a left end thereof with said main body by a shaft, and that said right turn connection rod is caused to swivel only at other end thereof which is provided with a pull rod capable of driving a movable display plate in one of said receiving compartments to move up and down, and further that said movable display plate is pressed by a spring fitted over said turning cable, said movable end provided with a retaining portion for keeping said right turn connection rod in a horizontal state and for causing said right turn connection rod to displace upwards only from said retaining portion;

a left turn connection rod located horizontally at said rear side of said movable display plate and at a center of an under side of said right turn connection rod, said left turn connection rod fastened with said main body by a shaft such that both ends of said left turn connection rod are capable of swinging in a reciprocating manner, said left turn connection rod further provided with a pull rod for driving a movable display plate to move up and down, and a retaining portion for keeping said left turn connection rod in a horizontal state and for causing a pull rod end of said left turn connection rod to move upwards in a reciprocating manner only from said retaining portion;

a turning cable longitudinal located between said retaining portions of said left turn connection rod and said right turn connection rods for enabling said left turn connection rod and said right turn connection rod to move in relation to each other, said turning cable provided with a spherical columnar urging portion, a compression spring, and a retrieval spring, said compression spring and said retrieval spring enabling said left turn connection rod and said right turn connection rod to move up and down when said turning cable is displaced up and down in a reciprocating manner;

a braking connection rod located horizontally between said left turn connection rod and said right turn connection rod such that one end of said braking connection rod is pivoted to a shaft connected with said main body, and that other end of said braking connection rod is capable of swiveling freely, said movable end being fastened with said main body by a retaining portion for confining said braking connection rod to displace upwards from a horizontal state on a fixed end acting as an axis, said movable end further provided with a pull rod for controlling an up-and-down motion of said movable display plate;

a braking cable having one end longitudinal put through a midsection of said braking connection rod, said braking cable having other end which is connected with said braking device of said bicycle, said braking cable further provided with a spherical columnar urging portion for pushing said braking connection rod to swivel up and down when said urging portion moves up and down in a reciprocating manner, said pull rod being capable of causing said movable display plate to move up and down;

said braking connection rod being fitted into a compression spring for enabling said movable display plate to return to an original position thereof after said movable display plate has displaced upwardly.

3. The bicycle warning devices as defined in claim 1, wherein said first display pieces and said second display pieces are of an arcuate construction and are arranged alternately to form a sectoral body having a circle center which is provided with a rotary shaft fastened with said main body, so as to enable said movable display plate to turn in said main body, and that said second display pieces are once again concealed by said first display pieces.

* * * * *